(12) United States Patent
Cho et al.

(10) Patent No.: US 6,810,020 B2
(45) Date of Patent: Oct. 26, 2004

(54) APPARATUS AND METHOD FOR MEASURING BIT ERROR RATE IN AN OFDM COMMUNICATION SYSTEM

(75) Inventors: Eun-Ee Cho, Daegu-kwangyeok-shi (KR); Ho Kim, Seoul (KR); Jong-Hyeon Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 493 days.

(21) Appl. No.: 09/772,207

(22) Filed: Jan. 29, 2001

(65) Prior Publication Data

US 2002/0004920 A1 Jan. 10, 2002

(30) Foreign Application Priority Data

Jan. 28, 2000 (KR) .......................................... 2000-4310

(51) Int. Cl.$^7$ ................................................. H04J 11/00
(52) U.S. Cl. .......................... 370/253; 370/333; 714/49
(58) Field of Search ............................. 714/48, 49, 50, 714/704; 370/204, 208, 232, 233, 234, 253, 333, 330; 375/224, 225, 226

(56) References Cited

U.S. PATENT DOCUMENTS 5,282,222 A  *  1/1994  Fattouche et al. .......... 375/260
5,444,697 A  *  8/1995  Leung et al. ................ 370/207
5,732,113 A  *  3/1998  Schmidl et al. ............. 375/355
5,953,311 A  *  9/1999  Davies et al. ............... 370/210

FOREIGN PATENT DOCUMENTS

EP  0 951 151 A2  10/1999

OTHER PUBLICATIONS

Japanese Office Action dated Sep. 19, 2003 issued in a counterpart application, namely, Appln. No. 01103202.2.

* cited by examiner

Primary Examiner—Dieu-Minh Le
(74) Attorney, Agent, or Firm—Dilworth & Barrese, LLP

(57) ABSTRACT

Disclosed is an apparatus for measuring a bit error rate (BER) in an orthogonal frequency division multiplexing (OFDM) communication system. A transmitter includes a pilot pattern inserter for inserting a first reference pilot pattern in subchannels of input data, and an OFDM modulator for OFDM-modulating the reference pilot pattern-inserted transmission data. A receiver includes a pilot pattern detector for OFDM-demodulating a data symbol received in a frame unit and detecting only a pilot pattern, and a BER operator for comparing the demodulated pilot pattern with a second reference pilot pattern, detecting and accumulating the number of pilot errors, and measuring a bit error rate by dividing the accumulated number of the pilot errors by the number of total received pilot patterns.

4 Claims, 3 Drawing Sheets

APPARATUS AND METHOD FOR MEASURING BIT ERROR RATE IN AN OFDM COMMUNICATION SYSTEM

PRIORITY

This application claims priority to an application entitled "Apparatus and Method for Measuring Bit Error Rate in an OFDM Communication System" filed in the Korean Industrial Property Office on Jan. 28, 2000 and assigned Ser. No. 2000-4310, the contents of which are hereby incorporated by reference.

BACKGROUND OF THE INVENTION

1. Field of the Invention

The present invention relates generally to an orthogonal frequency division multiplexing (OFDM) communication system, and in particular, to an apparatus and method for measuring a bit error rate (BER) using a pilot sub-channel in an OFDM communication system.

2. Description of the Related Art

The OFDM is a form of multi-carrier modulation technique. In OFDM each carrier is orthogonal to the other carriers. This modulation technique uses parallel data and frequency division multiplexing (FDM) with overlapping sub-channels to avoid the use of high-speed equalization, to combat impulsive noise and multi-path distortion, as well as to fully use the available bandwidth. A comparison between the OFDM system and a single-carrier system will be made, for the same transmission bandwidth and the same transfer rate. When the transmission data is dispersedly transmitted with N carriers, the duration of one transmission symbol for the OFDM system becomes N times longer than that of the single-carrier system. Therefore, the OFDM system can prevent degradation of the transmission characteristics by simply adding a bit guard interval on a time domain, even if there exists a multi-path interference. In addition, the data is dispersedly transmitted over the entire transmission band. Therefore, it is possible to effectively improve the characteristics by means of an interleaver and an error correction code, even though there exists an interference signal at a specific frequency band, since its influence is limited to only part of the data.

A conventional technique for measuring such a bit error rate uses a SNORE (Signal-to-Noise Ratio Estimation) algorithm. The SNORE algorithm calculates a bit error rate by using signal power and noise power. Specifically, the SNORE algorithm estimates a signal-to-noise ratio (SNR) by calculating average and variance of a received signal, and then calculates the bit error rate according to the estimated SNR. The SNR can be estimated using Equations (1) and (2) below.

$$\frac{E_b''}{N_o} = SN''R - \frac{(\mu'')^2}{2\sigma''^2} \quad (1)$$

$$\mu'' = \frac{1}{n}\sum_{i=0}^{n}|X_i| \quad (2)$$

where $\mu''$ is an average value of samples, $\sigma''$ is a particular sample, n is the total number of samples, and X is a received signal.

It is possible to calculate the bit error rate from a BER mapping table using the SNR value estimated in accordance with Equations (1) and (2). Since the SNORE algorithm using the SNR must calculate the average and variance of the received signal, it requires complicated calculations and additional circuitry. Further, since the variance of the estimated SNR is large, it is not possible to calculate an accurate BER.

SUMMARY OF THE INVENTION

It is, therefore, an object of the present invention to provide an apparatus and method for measuring a bit error rate using a pilot sub-channel in the data OFDM symbol.

It is another object of the present invention to provide a method for correctly measuring a bit error rate by comparing a demodulated received pilot pattern with a reference pilot pattern using a pilot sub-channel in an OFDM communication system.

To achieve the above and other objects, there is provided an apparatus for measuring a bit error rate (BER) in an OFDM communication system. A transmission device includes a pilot pattern inserter for inserting a first reference pilot pattern in subchannels of data OFDM symbol, and an OFDM modulator for OFDM-modulating the reference pilot pattern-inserted transmission data. A receiver includes a pilot pattern detector for OFDM-demodulating a data symbol received in a frame unit and detecting only a pilot pattern, and a BER operator for comparing the demodulated pilot pattern with a second reference pilot pattern, detecting and accumulating the number of pilot errors, and measuring a bit error rate by dividing the accumulated number of the pilot errors by the number of total received pilot patterns.

A method for measuring a bit error rate in an OFDM communication system according to the present invention comprises: upon receipt of transmission data, inserting a first reference pilot pattern in a data symbol, OFDM-modulating reference pilot pattern-inserted data symbol, and transmitting the modulated data symbol in a frame unit; demodulating the data symbol received in the frame unit, detecting a pilot pattern from the demodulated data symbol, and calculating the number of the total received pilots by accumulating the detected demodulated pilot pattern; comparing the detected demodulated pilot pattern with a second reference pilot pattern to detect pilot errors, and accumulating the number of the detected pilot errors; and measuring a bit error rate by dividing the accumulated number of the pilot errors by the number of the total received pilot patterns.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
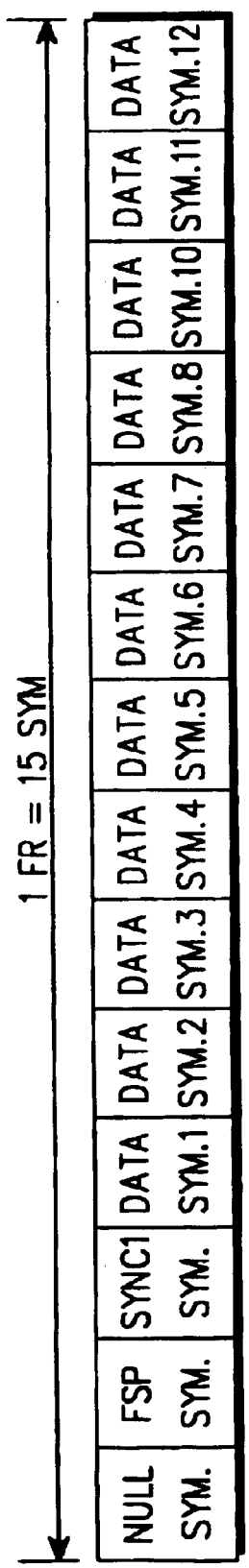
FIG. 1 is a diagram illustrating a frame structure for an OFDM system.

FIG. 1 illustrates a frame structure for an OFDM system, in which a frame is comprised of N OFDM symbols. The leading three OFDM symbols are a null symbol NULL, a frame synchronization pattern OFDM symbol FSP, and a reference OFDM symbol SYNC1. The remaining (N−3) symbols are actual valid data OFDM symbols. In practice, one frame is comprised of 15 symbols. The frame synchronous pattern (FSP) is used for detection of frame synchronization, and the synchronous symbol SYNC1 is used for OFDM demodulation. A specified number of pilot channels (or pilot subcarriers) are assigned to each symbol in addition to data channels (or data subcarriers). It can be easily understood from FIG. 2 how to assign the pilot channels to each data symbol.

Figure 2:
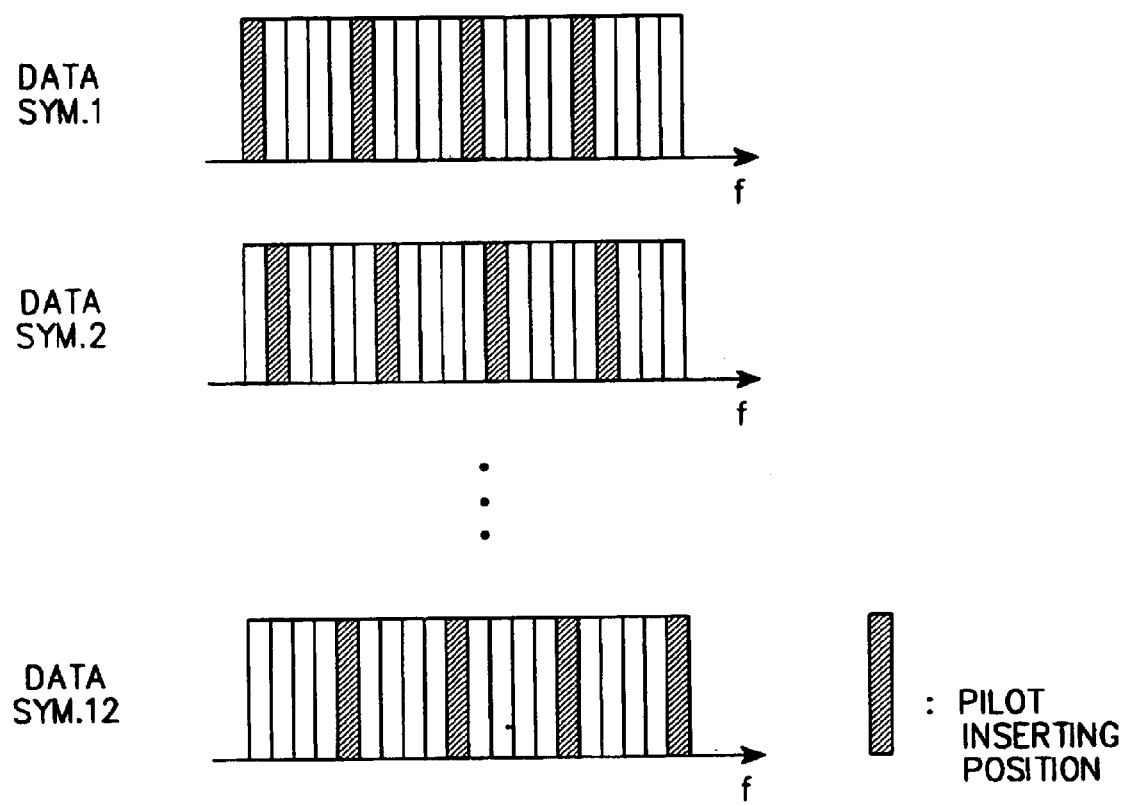
FIG. 2 is a diagram illustrating an OFDM symbol spectrum in which pilot symbols are inserted.

FIG. 2 illustrates an OFDM symbol structure in which pilot symbols are inserted. Here, 12 data symbols Data_Sym#1 through Data_Sym#12 are shown. In one symbol, the pilot channels are located at every twelfth subchannel, in order to enable the pilot subchannels of the 12 symbols to represent all the subchannels of the OFDM symbols. The reason for locating the pilot channels at every twelfth subchannel is because the frame structure given in the embodiment is comprised of 12 data symbols. The positions and interval of the pilot channels can be varied according to the number of data symbols. With regard to the pilot inserting positions in FIG. 2, the pilot inserting positions of the Data Sym#2 are shifted right by one subchannel from the pilot inserting positions of the Data_Sym#1. In this method, a predetermined number of pilots are assigned to the different subchannels at every symbol, so that the pilots are evenly assigned to all the subchannels of the OFDM symbol. The pilot channels assigned to the respective symbols are used to measure the bit error rate, and the procedure for measuring the bit error rate using the pilot channels will be described below.

Figure 3:
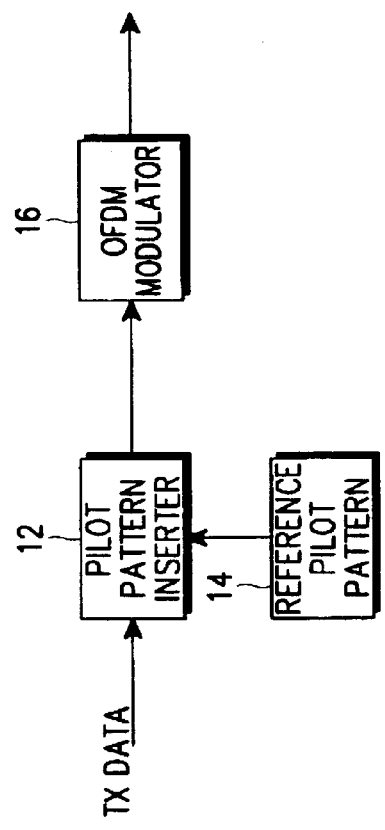
FIG. 3 is a block diagram illustrating a transmission device for an OFDM communication system according to an embodiment of the present invention.

FIG. 3 illustrates a block diagram of a transmitter for an OFDM communication system according to an embodiment of the present invention. The transmitter assigns the pilot channels to the respective data symbols as shown in FIG. 2.

Referring to FIG. 3, a pilot pattern inserter 12 receives a serial data stream mapped into a QPSK (Quadrature Phase Shift Keying) or QAM (Quadrature Amplitude Modulation) signal, inserts a reference pilot pattern 14 in the corresponding subchannels of the mapped transmission data as shown in FIG. 2, and provides its output data to an OFDM modulator 16. The pilot pattern-inserted data is OFDM-modulated by the OFDM modulator 16 before transmission.

The OFDM frame to which the pilot subchannels are assigned as shown in FIG. 2 by the operation of the OFDM transmitter is transmitted to a receiving side. The receiving side then measures the bit error rate using the pilot channels. A procedure for measuring the bit error rate in the receiving side will be described with reference to FIG. 4.

Figure 4:
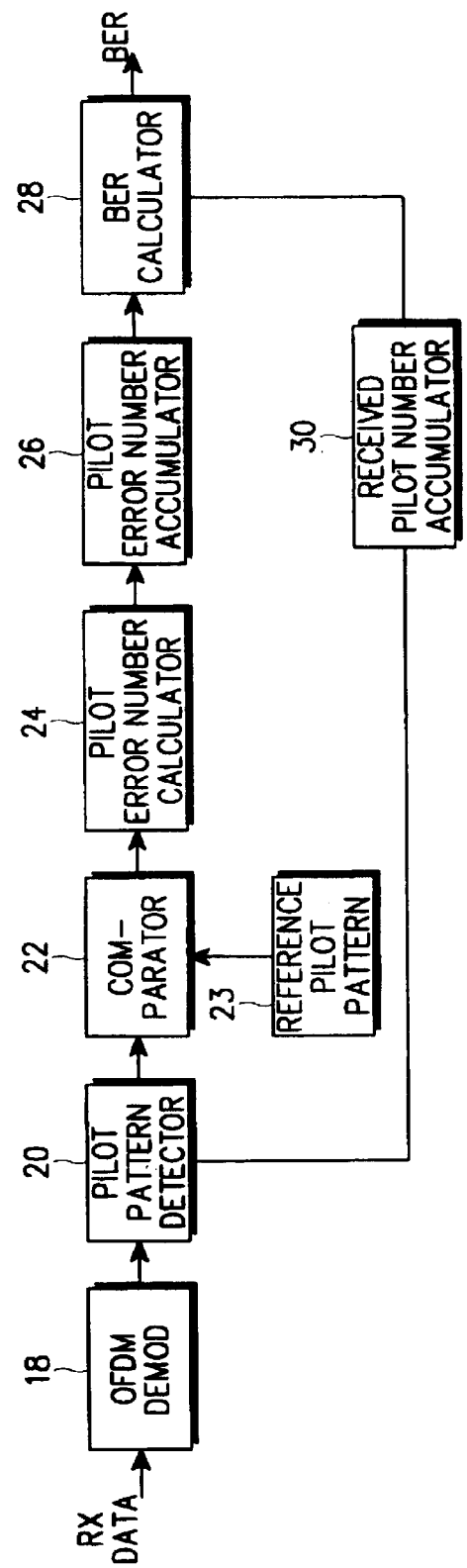
FIG. 4 is a block diagram illustrating an OFDM receiving device with a BER measuring device according to an embodiment of the present invention.

FIG. 4 illustrates a block diagram of an OFDM receiver with a BER measuring device according to an embodiment of the present invention.

An OFDM demodulator 18 receives the pilot channel-assigned OFDM data of FIG. 2, demodulates the data channels and the pilot channels in the data symbol, and provides them to a pilot pattern detector 20. The pilot pattern detector 20 then detects only the pilot pattern from the demodulated signal and provides the detected pilot pattern to a comparator 22. The comparator 22 compares the demodulated pilot pattern with a reference pilot pattern 23 received at another input end thereof, and provides the resulting comparison signal to a pilot error number calculator 24. Here, the reference pilot pattern 23 is equal to the reference pilot pattern 14 shown in FIG. 3. The pilot error number calculator 24 calculates the number of pilot errors from the comparison signal of the demodulated pilot pattern and the reference pilot pattern 23, and the calculated number of the pilot errors is accumulated by a pilot error number accumulator 26. The accumulated value is provided to a BER calculator 28.

Meanwhile, a received pilot number accumulator 30 connected between the pilot pattern detector 20 and the BER calculator 28, accumulates the demodulated pilot pattern detected by the pilot pattern detector 20 and provides the accumulated value to the BER calculator 28. The BER calculator 28 then calculates a bit error rate BER using the number of pilot errors output from the pilot error number accumulator 26 and the number of the total received pilots output from the received pilot number accumulator 30 in accordance with Equation (3) below.

$$BER = \frac{\text{No of Pilot Errors}}{\text{No of Total Received Pilots}} \quad (3)$$

The BER measuring method according to the embodiment of the present invention assigns the pilot channels to the respective symbols in the frame at the transmission side, and the receiving side then accumulates the number of the pilot errors and the number of the total received pilots and simply measures the bit error rate by calculating the number of the pilot errors versus the number of the total received pilots, thereby contributing to simplification of the system.

As described above, the invention assigns the predetermined subchannels without necessity of separately transmitting test data, by using the pilot channels used in the OFDM communication system. In addition, it is possible to measure the bit error rate by comparing the demodulated pilot pattern with the reference pilot pattern, and correctly detect the bit error rate for all the OFDM subchannels by evenly assigning the pilot channels to whole the OFDM symbols.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for measuring a bit error rate (BER) in an orthogonal frequency division multiplexing (OFDM) communication system, comprising:
    a transmitter including:
        a pilot pattern inserter for inserting a first reference pilot pattern in subchannels of input data, and outputting reference pilot pattern-inserted transmission data; and
        an OFDM modulator for OFDM-modulating the reference pilot pattern-inserted transmission data; and
    a receiver including:
        a pilot pattern detector for OFDM-demodulating a data symbol received in a frame unit and detecting only a pilot pattern; and
        a BER operator for comparing the demodulated pilot pattern with a second reference pilot pattern, detecting and accumulating the number of pilot errors, and measuring a bit error rate by dividing the accumulated number of the pilot errors by the number of total received pilot patterns, wherein the BER operator comprises:
- a comparator for comparing the demodulated pilot pattern with the second reference pattern and outputting comparison data;
- a pilot error number calculator for calculating the number of the pilot errors contained in the comparison data output from the comparator;
- a pilot error number accumulator for accumulating the calculated number of the pilot errors;
- a received pilot patterns number accumulator for accumulating the number of the demodulated pilot patterns; and
- a BER calculator for calculating the bit error rate by dividing the accumulated number of the pilot errors by the number of the total received pilot patterns.

2. The apparatus as claimed in claim 1, wherein the pilot pattern inserter inserts a pilot channel in each symbol in one frame using one of a fixed and dispersed pilot.

3. The apparatus as claimed in claim 1, wherein the first and second reference pilot patterns are equal to each other.

4. A method for measuring a bit error rate in an OFDM communication system, comprising the steps of:

upon receipt of transmission data, inserting a first reference pilot pattern in a data symbol;

OFDM-modulating reference pilot pattern-inserted data symbol;

transmitting the modulated data symbol in a frame unit;

receiving the modulated data symbol in the frame unit;

demodulating the data symbol received in the frame unit;

detecting a pilot pattern from the demodulated data symbol;

calculating the number of the total received pilots patterns by accumulating the detected demodulated pilot pattern;

comparing the detected demodulated pilot pattern with a second reference pilot pattern to detect pilot errors;

accumulating the number of the detected pilot errors; and measuring a bit error rate by dividing the accumulated number of the pilot errors by the number of the total received pilot patterns.

* * * * *